United States Patent [19]

Pierce et al.

[11] 4,209,351
[45] Jun. 24, 1980

[54] AMBIENT CURED SMOKELESS LINER/INHIBITOR FOR PROPELLANTS

[75] Inventors: Everette M. Pierce, Somerville; Henry C. Allen, Decatur, both of Ala.

[73] Assignee: The United States of America as represented by the Secretary of the Army, Washington, D.C.

[21] Appl. No.: 912,810

[22] Filed: Jun. 5, 1978

[51] Int. Cl.$^2$ .......................... C06B 45/10; F42B 1/00
[52] U.S. Cl. .................................. 149/19.1; 102/103; 149/2
[58] Field of Search .............. 102/103; 149/19.1, 19.9, 149/2

[56] References Cited

U.S. PATENT DOCUMENTS

| | | | |
|---|---|---|---|
| 2,997,376 | 8/1961 | Bartley | 149/19.1 |
| 3,046,829 | 7/1962 | Roemer | 102/103 |
| 3,278,352 | 10/1966 | Erickson | 149/19.1 |
| 3,433,158 | 3/1969 | Pierce | 102/103 |
| 3,507,114 | 4/1970 | Webb | 102/103 |
| 3,636,881 | 1/1972 | Godfrey | 102/103 |
| 3,706,610 | 12/1972 | Ferguson | 149/19.1 |
| 3,714,047 | 1/1973 | Marion et al. | 102/103 |
| 3,726,829 | 4/1973 | Sayks | 149/19.9 |
| 4,111,728 | 9/1978 | Ramnarace | 149/19.5 |

*Primary Examiner*—Edward A. Miller
*Attorney, Agent, or Firm*—Nathan Edelberg; Robert P. Gibson; Jack W. Voigt

[57] ABSTRACT

A liner composition is employed as a liner/inhibitor for a solid propellant grain while functioning as a liner-binder between the propellant grain and insulation or the motor case. The liner and inhibitor composition is prepared from the conventional binder systems (e.g., hydroxy terminated polybutadiene (HTPB), polysulfide, polyurethane, and polyester). The composition employs a cool burning oxidizer selected from oxamide and nitroguanidine. The type of solid propellant grain, particularly the crosslinking or reaction mechanism to form a chemical bond between the binder of the liner composition and the binder of the propellant, dictates the type formulation of the liner/inhibitor composition. A representative liner/inhibitor for a HTPB propellant grain contains from about 10 to about 70 weight percent oxidizer, from about 0.1 to about 1.0 weight percent cure catalyst selected from ferric acetyl acetonate and triphenyl bismuth, an isocyanate curing agent selected from toluene diisocyanate, hexamethylene diisocyanate, and isophorone diisocyanate from about 1 to about 10 weight percent, and the balance of formulation hydroxy terminated polybutadiene. The use of the proper cure catalyst will produce a cured system at ambient (70° F. or higher) in 24 hours.

A chemical bond is formed between the liner and inhibitor binder and the propellant binder by the crosslinking action of the isocyanate curing agent and the hydroxyl groups of the binder systems. The chemical bond withstands the stresses of gas flow as well as the effects of spinning the rocket motor. Thus, the cool burning oxidizer in combination with the bonds between the binder systems which withstands the flow of gases will result in extinguishment of the liner/inhibitors at sudden pressure drop encountered at end of propellant grain burning and thereby result in elimination of smoke from the liner/inhibitor which is extinguished prior to bond failure.

4 Claims, No Drawings

AMBIENT CURED SMOKELESS LINER/INHIBITOR FOR PROPELLANTS

DEDICATORY CLAUSE

The invention described herein may be manufactured, used, and licensed by or for the Government for governmental purposes without the payment to us of any royalties thereon.

BACKGROUND OF THE INVENTION

A liner and inhibitor composition for a solid propellant rocket motor performs the functions of securing the solid propellant grain to the insulation or rocket motor case while reducing the temperature toward the liner and insulation. Most of the current liners and inhibitors for solid propellants produce smoke during motor operation. Smoke can be produced after the inhibited portion of the propellant grain burns away from the inhibitor. Smoke can be produced as a result of liner pyrolysis after the propellant burns away. Many times in the larger motors, the inhibitor and liner continue to burn for several seconds producing clouds of smoke. It is readily apparent that these clouds of smoke are detrimental where concealment is a requirement such as in a military operation. More recently the impact to the environment of any contaminants such as excessive smoke have been of concern. Therefore to accomplish a mission without emitting undesirable smoke should be encouraged and should be recognized as a meritorious achievement.

The production of smoke has caused emphasis to be placed on research and development to lessen the plume smoke contamination problem; not only for the reasons noted above, but additionally, for areas of performance which relate to transmission of signals or receiving signals from a guidance and control module.

The primary object of this invention is to provide a liner and inhibitor composition for a solid propellant composition to effect improvement by reducing plume smoke contamination.

Another object of this invention is to provide a liner and inhibitor composition that forms a chemical bond between this composition and the propellant grain such that the chemical bond can withstand the stresses encountered during temperature cycling, during propellant firing, and during rocket motor spin.

A further object of this invention is to provide a liner and inhibitor composition which employs a cool burning oxidizer which is effective in controlling the burn rate and temperature to yield the desired time of inhibition for the propellant grain for the purpose of retaining the chemical bond between the propellant grain binder and the inhibitor binder.

SUMMARY OF THE INVENTION

The liner and inhibitor composition of this invention establishes a chemical bond between the binder portion of the liner and inhibitor composition and the propellant composition with which it is used. The chemical bond formed withstands the stresses of rocket motor storage and operation. Additionally, when the sudden pressure drop takes place, at the end of propellant burning, the liner and inhibitor composition will extinguish thereby eliminating smoke which would normally be produced from continued burning of liner after propellant grain burns away.

The liner and inhibitor composition of this invention employs a cool burning oxidizer selected from oxamide and nitroguanidine in a weight percent amount from about 10 to about 70.0%, a binder selected from a hydroxy terminated polybutadiene, polysulfide, polyurethane, and polyester in a weight percent amount from about 19 to about 70, a curing agent selected in accordance with the binder selected in a weight percent amount from about 1.0 to about 10.0, and a cure catalyst selected in accordance with the binder and curing agent selected in a weight percent amount from about 0.1 to about 1.0.

DESCRIPTION OF THE PREFERRED EMBODIMENT

The liner and inhibitor composition of this invention effects a chemical bond which extends between the liner and inhibitor composition and the binder composition of the solid propellant grain. The bond is stable under motor operating conditions, and the cool burning oxidizer employed and selected frm oxamide and nitroguanidine causes extinguishment of the liner and inhibitor composition when a sudden pressure drop occurs at end of propellant burning.

The liner and inhibitor composition of this invention employs a conventional binder system selected from hydroxy terminated polybutadiene (HTPB), polysulfide, polyurethane, and polyester, a cool burning oxidizer selected from oxamide and nitroguanidine, a curing agent selected in accordance with the binder selected, and a curing catalyst selected in accordance with the binder and curing agent selected. The cure catalyst enables a cure to take place at ambient temperature which is an advantage both in time saving and for properties achieved in the cured composition.

Example I illustrates a typical liner and inhibitor composition (A) for use with a HTPB propellant composition or a typical polysulfide propellant composition (B). The short ambient cure system isophorone diisocyanate (IPDI) and chromium octoate of composition (A) provides a definite advantage plus elimination of some of the ingredients.

EXAMPLE I

| LINER AND INHIBITOR COMPOSITION A | | |
|---|---|---|
| Ingredient | Weight Percent | Weight Percent Range |
| LP-2 | 23.0 | 10.0–30.0 |
| LP-3 | 23.0 | 10.0–30.0 |
| Chromium Octoate | 0.4 | 0.1–1.0 |
| Oxamide | 47.3 | 69.9–31.0 |
| IPDI | 6.3 | 3.0–8.0 |
|  | 100.0 |  |

| POLYSULFIDE PROPELLANT COMPOSITION B | |
|---|---|
| Ingredient | Weight Percent |
| Ammonium perchlorate | 63.0 |
| Liquid polymer (polysulfide) | 33.5 |
| p. benzoquinone dioxime | 1.6 |
| Diphenylguanidine | 0.7 |
| Sulfur | 0.2 |
| Magnesium oxide | 1.0 |
|  | 100.0 |

LP is liquid polymers (polysulfide). Any wide range of polysulfide polymers may be used with molecular weights ranging from about 300 to about 4000. LP-2 has a molecular weight of about 4,000 and LP-3 has a molecular weight of about 1,000. LP-2 and LP-3 are used because they are typical, readily available, and they perform the function well of inhibiting the 6-inch grains employed in a smokeless application motor program. In using composition A, the 6-inch diameter grains (both polysulfide and hydroxy terminated polybutadiene grains) were inhibited with about 1/16 and 1/32 inch thickness of composition A. The tested motors operated smoothly and showed no sign of grain-inhibitor separation while showing a progressive improvement in the plume smoke contamination problem. Thus, composition A is effective for use with both polysulfide and hydroxy terminated polybutadiene grains.

If high molecular weight polymers are not readily available, the low molecular weight polysulfide liquid polymers can be converted to high molecular weight polymers by oxidation of the mercaptan terminals to produce disulfide linkages.

Some of the cure catalyst used in polysulfide polymers are: lead peroxide, cumene hydroperoxide, zinc oxide, p-quinone dioxime, zinc peroxide, inorganic cobalt salts, and furfural. One of the most widely used cure systems is p-benzoquinone dioxime, diphenylguanidine and sulfur as shown in formulation B.

Example II illustrates another typical line and composition C which is also useful with a typical hydroxy terminated polybutadiene propellant grain.

EXAMPLE II

| LINER AND INHIBITOR COMPOSITION C | | |
|---|---|---|
| Ingredient | Weight-Percent | Weight Percent Range |
| Oxamide or nitroguanidine | 50.0 | 10-70 |
| ferric acetyl acetonate or triphenyl bismuth | 0.04 | 0.01-1.0 |
| HTPB polymer | 44.8 | 19.0-69.9 |
| isophorone diisocyanate curing agent | 5.16 | 1.0-10.0 |
| | 100.0 | |

Under actual test conditions it is noted that composition A of Example I proved to be effective for use with either polysulfide propellant grains or hydroxy terminated polybutadiene propellant grains. It is also useful with polyurethane or polyester propellant grains since they employ isocyanate curing systems. Composition C is useful for inhibiting any isocyanate curable propellant grain. The isocyanate curable grains such as hydroxy terminated polybutadienes and other composite grains such as the polyurethane grains and the polyester grains are well established in the art. The binder ingredients for the polyurethane and polyester grains are well known, and they include polyglycol adipate (PGA), polyethylene glycol, polycapralactones, etc. The plasticizers employed can be of the energetic or non-energetic type. Thus, the range of compositions which can be inhibited by the illustrative liner/inhibitor compositions is extensive since the common factor required is the crosslinking chemistry to achieve the chemical bond between the liner/inhibitor binder and the binder of the propellant grain.

We claim:

1. An ambient cured smokeless liner/inhibitor composition for use with a solid propellant grain to establish a chemical bond between said liner/inhibitor binder and the binder system of said solid propellant grain, said solid propellant binder system selected from the group consisting of hydroxy terminated polybutadiene, polysulfide, polyurethane, and polyester, said smokeless liner/inhibitor composition comprising:

(i) a liner/inhibitor binder of polysulfide in an amount from about 19.0 to about 70.0 weight percent of said liner/inhibitor composition;

(ii) a curing agent selected from the group consisting of lead peroxide, cumene hydroperoxide, zinc oxide, p-quinone dioxime, zinc peroxide, toluene diisocyanate, hexamethylene diisocyanate, and isophorone diiscyanate in an amount from about 1.0 to about 10.0 weight percent of said liner/inhibitor composition;

(iii) a cure catalyst selected from the members of the goup of catalysts consisting of inorganic cobalt salts, furfural, chromium octoate, ferric acetyl acetonate and triphenyl bismuth in an amount from about 0.1 to about 1.0 weight percent of said liner/inhibitor composition; and (iv) a cool burning oxidizer selected from the group consisting of oxamide and nitroguanidine in an amount from about 10.0 to about 70.0 weight percent of said liner/inhibitor composition.

2. The ambient cured smokeless liner/inhibitor composition of claim 1 wherein said liner/inhibitor binder selected is polysulfide in an amount of about 46 weight percent of said liner/inhibitor composition; said curing agent selected is isophorone diisocyanate in an amount of about 6.3 weight percent of said liner/inhibitor composition; said cure catalyst selected is chromium octoate in an amount of about 0.4 weight percent; and said cool burning oxidizer selected is oxamide in amount of about 47.3 weight percent.

3. The ambient cured smokeless liner/inhibitor composition of claim 2 wherein said solid propellant grain employs the selected propellant binder system of polysulfide.

4. The ambient cured smokeless liner/inhibitor composition of claim 2 wherein said solid propellant grain employs the selected propellant binder system of hydroxy terminated polybutadiene.

* * * * *